(12) United States Patent
Jackson et al.

(10) Patent No.: US 8,705,519 B2
(45) Date of Patent: Apr. 22, 2014

(54) METHOD AND APPARATUS FOR LOCALIZED VOICE OVER INTERNET PROTOCOL USAGE

(75) Inventors: Donald C. Jackson, Monte Sereno, CA (US); Michael J.B. Epstein, Mountain View, CA (US); John Giannandrea, Palo Alto, CA (US); Mark A. Verber, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1283 days.

(21) Appl. No.: 11/877,556

(22) Filed: Oct. 23, 2007

(65) Prior Publication Data

US 2008/0095147 A1    Apr. 24, 2008

Related U.S. Application Data

(63) Continuation of application No. 09/687,484, filed on Oct. 13, 2000, now Pat. No. 7,286,521.

(60) Provisional application No. 60/219,911, filed on Jul. 21, 2000.

(51) Int. Cl.
| | |
|---|---|
| *H04L 12/26* | (2006.01) |
| *H04J 1/16* | (2006.01) |
| *G08C 15/00* | (2006.01) |
| *G06F 11/00* | (2006.01) |
| *G01R 31/08* | (2006.01) |

(52) U.S. Cl.
USPC ............ 370/356; 370/236; 370/352; 709/227

(58) Field of Classification Search
USPC .................. 370/352–356, 401–465, 236; 709/206–239; 379/229–230
See application file for complete search history.

(56) References Cited

U.S. PATENT DOCUMENTS

| | | | |
|---|---|---|---|
| 5,497,373 | A | 3/1996 | Hulen et al. |
| 5,799,063 | A | 8/1998 | Krane |
| 6,070,187 | A | 5/2000 | Subramaniam et al. |
| 6,226,289 | B1 | 5/2001 | Williams et al. |
| 6,240,449 | B1 | 5/2001 | Nadeau et al. |
| 6,314,402 | B1 | 11/2001 | Monaco et al. |
| 6,393,467 | B1 | 5/2002 | Potvin et al. |
| 6,404,746 | B1 | 6/2002 | Cave et al. |
| 6,434,139 | B1 * | 8/2002 | Liu et al. ................ 370/352 |

(Continued)

OTHER PUBLICATIONS

Network Working Group Request for Comments: 2648; S. Petrack et al., Jun. 2000, pp. 1-73.

(Continued)

*Primary Examiner* — Man Phan
(74) *Attorney, Agent, or Firm* — Perkins Coie LLP

(57) ABSTRACT

An approach to abstracting the circuit switched nature of the public switched telephone network (PSTN) by using VoIP to provide voice actuated services is disclosed. By carrying a telephone call using VoIP technology for a short distance (frequently within a server room) significant benefits to call handling and capacity management can be obtained. Specifically, a PSTN-to-IP gateway is used to receive (and place) calls over the PSTN and route those calls internally to servers over an IP network in a packet switched format. A number of computer systems can receive and handle the calls in the IP format, including: translating the packets into an audio format suitable for speech recognition and creating suitable packets from computer sound files for transmission back over the PSTN.

21 Claims, 4 Drawing Sheets

(56) References Cited

U.S. PATENT DOCUMENTS

| | | |
|---|---|---|
| 6,490,564 B1 | 12/2002 | Dodrill et al. |
| 6,512,818 B1 | 1/2003 | Donovan et al. |
| 6,587,558 B2 | 7/2003 | Lo |
| 6,600,736 B1 | 7/2003 | Ball et al. |
| 6,604,075 B1 | 8/2003 | Brown et al. |
| 6,614,781 B1 | 9/2003 | Elliott et al. |
| 6,625,141 B1 * | 9/2003 | Glitho et al. ............ 370/352 |
| 6,628,769 B1 | 9/2003 | Vleer et al. |
| 6,654,722 B1 | 11/2003 | Aldous et al. |
| 6,678,359 B1 | 1/2004 | Gallick |
| 6,693,893 B1 | 2/2004 | Ehlinger |
| 6,735,209 B1 * | 5/2004 | Cannon et al. ............ 370/401 |
| 6,747,970 B1 * | 6/2004 | Lamb et al. ............... 370/352 |
| 6,788,675 B1 * | 9/2004 | Yang ....................... 370/352 |
| 6,801,604 B2 | 10/2004 | Maes et al. |
| 6,807,574 B1 | 10/2004 | Partovi et al. |
| 6,842,447 B1 * | 1/2005 | Cannon ..................... 370/352 |
| 7,286,521 B1 | 10/2007 | Jackson et al. |
| 7,313,131 B2 * | 12/2007 | O'Connor et al. ......... 370/352 |
| 7,742,421 B2 * | 6/2010 | Bantukul et al. .......... 370/236.1 |
| 7,929,419 B2 * | 4/2011 | Sprague .................... 370/218 |
| 8,139,729 B2 * | 3/2012 | Phelps et al. .............. 379/88.18 |
| 8,203,946 B1 * | 6/2012 | Chu et al. ................. 370/230 |
| 8,271,660 B2 * | 9/2012 | Schulzrinne et al. ....... 709/227 |
| 8,306,021 B2 * | 11/2012 | Lawson et al. ............ 370/352 |
| 2002/0010760 A1 | 1/2002 | Armenta et al. |

OTHER PUBLICATIONS

Internet Engineering Took Force; SIP: Session Initiation Protocol: Handley/Schulzrinne/Schooler/Rosenberg: Sep. 4, 2000, pp. 1-131.

* cited by examiner

METHOD AND APPARATUS FOR LOCALIZED VOICE OVER INTERNET PROTOCOL USAGE

RELATED CASES

This application is a continuation of U.S. patent application Ser. No. 09/687,484, filed on Oct. 13, 2000, now U.S. Pat. No. 7,286,521, issued Oct. 23, 2007, entitled "LOCALIZED VOICE OVER INTERNET PROTOCOL COMMUNICATION," which application claims the benefit of U.S. Provisional Application No. 60/212,911, filed Jul. 21, 2000, which applications are herein incorporated by reference in their entireties.

BACKGROUND OF THE INVENTION

1. Field of the Invention

This invention relates to the field of telephony. In particular, the invention relates to technologies for using voice over Internet Protocol (VoIP) solutions in a number of configurations to increase flexibility and reliability of call handling systems.

2. Description of the Related Art

FIG. 1 shows an example of the use an efficiently arranged prior art system for supporting voice activated services over a telephone interface at element 130. FIG. 1 superimposes that configuration on a high level view of such a platform as illustrated by telephone 100 coupled to the telephone network 104, which is in turn coupled to a telephone gateway 107, and a phone application platform 110. In one embodiment, the phone application platform 110 can correspond to a voice portal that provides voice activated access to a variety of information including personalized content. Such a platform is described in greater detail in U.S. patent application Ser. No. 09/426,102, now U.S. Pat. No. 6,807,574 issued Oct. 19, 2004, entitled "Method and Apparatus for Content Personalization over Telephone Interface."

As FIG. 1 shows, functionally the interface with the telephone network 104 (e.g. the public switched telephone network or PSTN) is conceptually separate from the phone application platform 110, in order to achieve efficient configurations with traditional telephony equipment, the hardware to support those functions may not be as cleanly separated as shown in element 130: where there is a physical termination of one or more PSTN circuit switched calls, e.g. DS3 line in 112. A single DS3 includes 28 primary rate interfaces (PRIs), each including 24 dedicated voice channels for a total of 672 dedicated voice channels. In order to handle this number of calls, the PRIs are multiplexed out using multiplexer 114 to a collection of servers with telephony cards 116A-Z for handling the PRI and the voice communications channels therein. In one configuration, a set of Dialogic signal cards model numbers D/480SC-2TI and Antares/2000x50 from Dialogic Corporation, Parsippany, N.J., are use to handle the PRIs.

Some inefficiencies result from the preceding configuration, for example, in order to readily support "tromboning" (connections between an incoming caller and one or more parties on an outbound call) the two calls need to be handled by the same server 116. Similarly, features like conference calls have similar dependencies. Accordingly, the telephone network 104 must be programmed to distribute the voice calls across the PRIs within the DS3 to leave sufficient capacity for outbound calling purposes. Further, physical proximity between the telephone gateway 107 and the phone application platform 110 is effectively enforced by the need for the servers supporting the phone application platform 110 to be in sufficient proximity to allow termination of circuit switched calls on those servers.

FIG. 2 illustrates prior art uses of Voice over Internet Protocol (VoIP) techniques to provide telephony services. Prior to VoIP type technologies, a telephone call from the telephone 200A to the telephone 200B would be carried by a series of circuit switched connections from the local telephone network 204A to the long distance telephone network 210 and on to the local telephone network 204B before reaching the telephone 200B. Some new entrants into the long distance market have begun offering lower cost transmission through the Internet 208, and more generally packet switched networks, using suites of protocols such as voice over Internet Protocol (VoIP) and gateways such as the VoIP gateways 206A-B. Frequently, such new entrants are thought of as providing lower quality service than the circuit switched network (this is frequently the case due to the use of heavy compression as well as transmission in a best effort network). Similarly, using VoIP some new entrants encourage people to use their computers to place voice (as well as video) calls from computer to computer, e.g. computer 212A to computer 212B. Some services even allow connections from computer, e.g. computer 212A, to a telephone, e.g. telephone 200A, again in the hopes of providing cut rate services since the calling party may be able to avoid many taxes and surcharges typically imposed on long distance calling The prior approaches to providing voice activated services have been focused on the circuit switched orientation of the telephone network. Prior packet switched approaches for handling voice communications have been characterized by an end-to-end philosophy of call placement. Accordingly, what is needed is a better configuration for handling receipt and transmission of audio from and to the telephone network 104 that provides increased flexibility while maintaining compatibility with the existing telephone network 104 by leveraging VoIP standards to provide new services and functions.

SUMMARY OF THE INVENTION

An approach to abstracting the circuit switched nature of the public switched telephone network (PSTN) by using VoIP to provide voice actuated services is disclosed. By carrying a telephone call using VoIP technology for a short distance (frequently within a server room) significant benefits to call handling and capacity management can be obtained. Specifically, a PSTN-to-IP gateway is used to receive (and place) calls over the PSTN and route those calls internally to servers over an IP network in a packet switched format. A number of computer systems can receive and handle the calls in the IP format, including: translating the packets into an audio format suitable for speech recognition and creating suitable packets from computer sound files for transmission back over the PSTN.

In some embodiments, a proxy server is used to balance call load amongst a pool of server computers handling the phone calls as they are passed off from the gateway in IP form. This may also be used to reduce the need to reserve capacity on specific server computers based on circuit capacity. For example, in the prior art configuration each telephony server readily supported only a fixed number of circuits due to the physical connectivity properties. Thus if a single PRI (23 usable phone lines in North America) were connected to a server, then to easily support outgoing calls (tromboning), it is necessary to reserve capacity on that PRI. In contrast, with a packet switched abstraction, the server does not have to be concerned with which PRI, DS3, etc., is handling the incoming and outgoing legs of the call session since the capacity limit is solely based on total packet network bandwidth and processor capability on the server (both of which are more flexible than circuit capacity). Similarly, advanced calling features such as conference calling that would have previously required reservation of a large number of ports on a single telephony card and be handled more elegantly.

It should be noted that this approach is not necessarily cost reducing, e.g. the cost of the telephony gateway 107 and phone application platform 110 will not necessarily be reduced. Rather, and perhaps counter-intuitively, costs may go up since the PSTN-to-IP gateway can be rather expensive, especially if purchased in redundant pairs. Further, expensive network switches and routers to support several thousand uncompressed packet format data streams will be necessary as well. In contrast, most VoIP installations make use of (heavy) compression and expect only best effort delivery of packets. The need to perform high quality speech recognition makes such compression (as well as an unreliable network) undesirable.

Additionally, this situation is counter-intuitive to the general trend in VoIP telephony of establishing many points of presence (POPs) throughout the nation to avoid long distance charges. Rather, this approach leverages the PSTN for what it is good at: long haul transmission of voice data at a fixed quality of service and then makes use of VoIP to abstract those details. Telephone carriers who feel comfortable delivering calls directly in VoIP formats may be permitted to terminate their calls as such as well; however, that is not necessary.

DETAILED DESCRIPTION

A. Introduction

Figure 1:
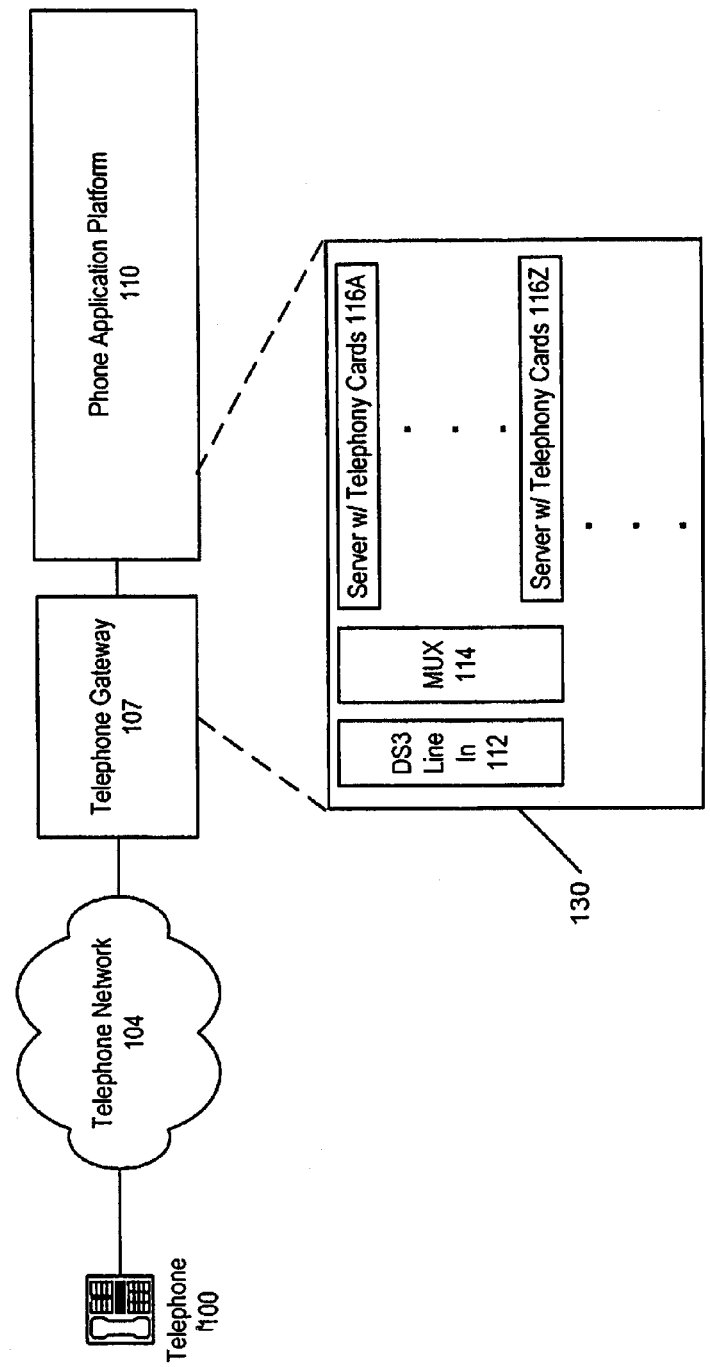
FIG. 1 illustrates a prior art system for supporting voice activated services over a telephone interface.

The invention will be described in greater detail as follows. First, a number of definitions useful to understanding the invention are presented. Then, the hardware and software architecture for localized voice over Internet Protocol (VoIP) usage will be considered. Finally, the processes and features of the environment are presented in greater detail.

B. Definitions

1. Telephone Identifying Information

For the purposes of this application, the term telephone identifying information will be used to refer to ANI information, CID information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone. e.g. cellular, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information of relevance to the user, e.g., account number, name, contact information, user-id, default preferences, and the like. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif. the system may automatically provide the Palo Alto weather report without further prompting. In other embodiments, the user may be prompted to confirm the system's implicit choice. e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

C. VoIP Configuration

Figure 3:
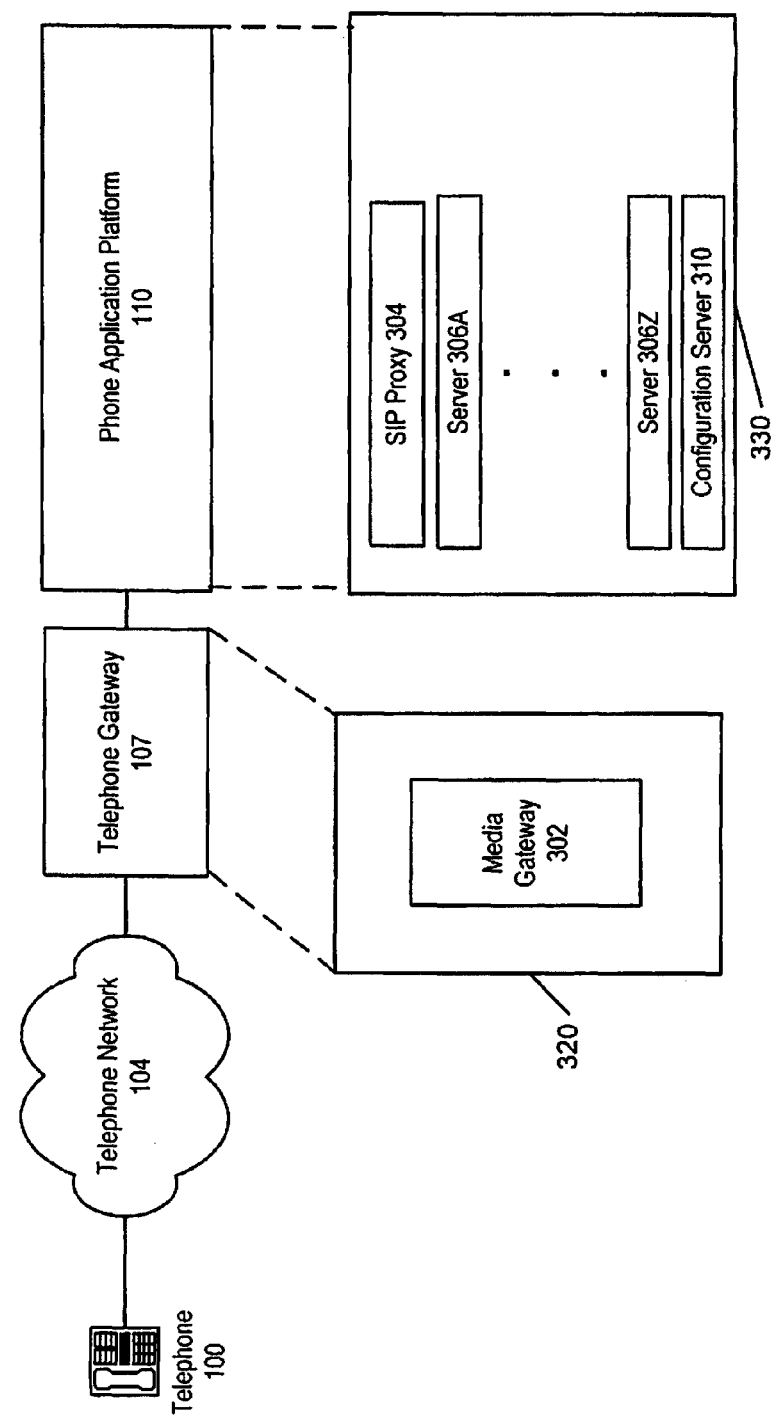
FIG. 3 illustrates a system including an embodiment of the invention for supporting voice activated services over a telephone interface.

FIG. 3 illustrates a system including an embodiment of the invention for supporting voice activated services over a telephone interface. The top portion of the figure shows the functional components labeled according to the labeling of FIG. 1, e.g. telephone 100, telephone network 104, telephone gateway 107, and phone application platform 110. The bottom portion shows the new implementation approach that is based on a VoIP architecture. The implementation components of the telephone gateway 107 are shown in element 320 while the implementation components for a portion of the phone application platform 110 are shown in element 330.

Unlike in the prior art system, there is a clean separation between the telephone gateway 107 implementation and the phone application platform 110 implementation. This promotes modularity and improves functionality. The telephone gateway 107 is supported by one or more media gateways 302. A media gateway is a term for products such as Cisco AS5300 from Cisco Corporation, San Jose, Calif., GSX 9000 from Sonus Networks, Inc., Westford, Mass., and MultiVoice MAX TNT from Lucent Technologies, Murray Hill, N.J. More generally the media gateway 302 is a device for routing circuit switched telephone network calls to a packet switched network (and vice-versa.) Some media gateways may be capable of handling several thousand calls simultaneously. Further, as appropriate, redundant media gateways can be configured to interoperate appropriately with the telephone network 104.

Figure 2:
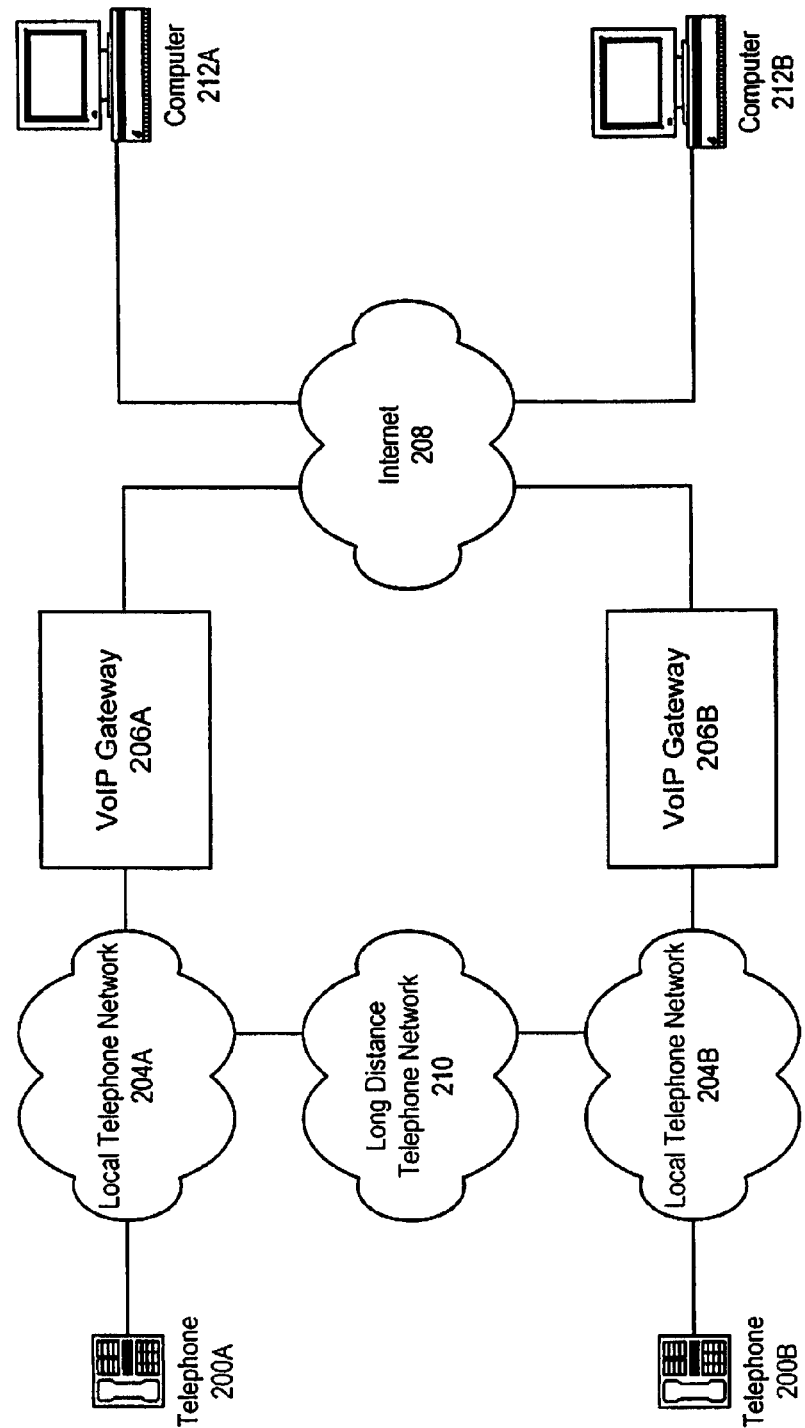
FIG. 2 illustrates prior art uses of Voice over Internet Protocol (VoIP) techniques to provide telephony services.

Importantly, to the left of the media gateway 302 in FIG. 3, a telephone call is carried in a circuit switched fashion while on the right it is carried in a packet switched fashion. This avoids the problem of established telecommunication carriers who are unprepared to provide direct VoIP connections to customers (see, e.g. left side of FIG. 2, showing that VoIP carriers start-and-terminate circuit switched calls.) If the telecommunication carrier supports it, the telephone gateway can 107 can also include facilities for directly receiving VoIP calls.

Before discussing call completion, consider the implementation of the phone application platform 110. A number of computers, servers 306A-Z, can be provided together with a session initiation protocol (SIP) proxy 304. The servers 306A-Z can be comprised of one or more computers, typically of a server, or rack mount variety. According to one embodiment, a Network Engine server from Network Engines, Inc., Canton, Mass., is used for the servers 306A-Z because it is a compact, 1 rack unit (1 U) high, yet powerful computer system.

Through the use of one or more (proposed) standard Internet Engineering Task Force (IETF) protocols such as SIP (RFC 2543), the SIP proxy 304 can relay information from the media gateway 302 to the servers 306A-Z about incoming calls and allow them to handle the sessions. The term "proxy" is used to describe the SIP proxy 304; however, such use is not in strict conformance with the definition in RFC 2543. Rather, the SIP proxy 304 may be in the terms of RFC 2543 a "proxy", a "proxy server", a "redirect server", a "server", and/or some other type of device and/or program for balancing distribution of SIP requests (incoming calls) across the servers 306A-Z.

Figure 4:
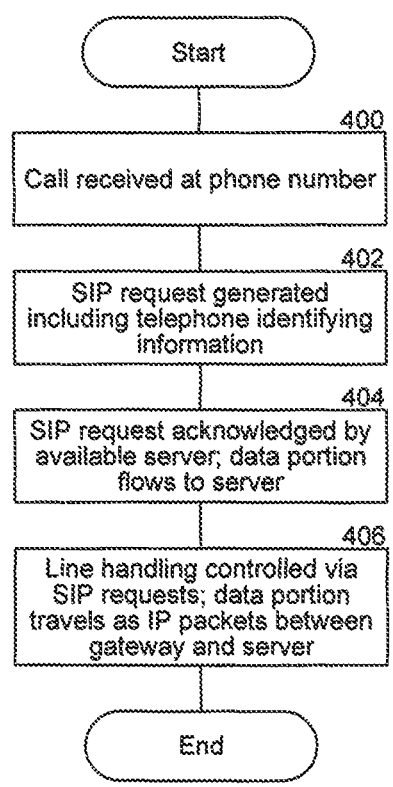
FIG. 4 is a process flow diagram for handling a call according to one embodiment of the invention.

The call handling flow according to the implementation in FIG. 3 will now be considered in connection with FIG. 4. First, at step 400, a call is received at the phone number of the phone application platform 110. For this example, the phone number will be +1 (800) 555-TELL (555-TELL and 5555-TELL are registered trade marks of Tellme Networks, Inc.); however, other numbers could be used, e.g. international free phone numbers +800 5555-TELL, country specific numbers, and non-free numbers, e.g. +1 (650) 555-1212. The phone call is received when the circuit switched telephone network 104 carries the signal (via a circuit) to the telephone gateway 107 (and thus the media gateway 302).

Next, at step 402, a SIP request is generated (see RFC 2543 generally for format) by the media gateway 302 to the SIP proxy 304. The SIP request can include suitable telephone identifying information, e.g. dialed number, calling party number, ANI, etc. The SIP proxy 304 will then redirect, proxy, forward, and/or otherwise cause the request to be passed to one of the servers 306A-Z for acknowledgement and handling. Criteria for distribution amongst the servers may include: the telephone identifying information (e.g. some servers are reserved for certain calling (or called) parties); server load (e.g. evenly distribute workload across the different servers relative to their capacity to handle calls); online/offline status of individual servers; network monitoring showing faults with one or more servers; and/or other criteria selected by the operator of the phone application platform 110.

For example, according to one embodiment, in order to test a new hardware and/or software configuration of a particular server (e.g. the server 306Z) a predetermined percentage of calls might be routed to that server. Similarly, if a better servers become available and are added to the existing pool, the distribution of calls could be evenly distribute based on weighted capacity. In such a configuration, a server that could handle 100 simultaneous calls versus and earlier server that only handled 50 would be considered equally loaded based on the ratio of number of current calls to capacity, e.g. 5 on the older server, and 10 on the newer server are equivalent: 5/50=1/10=10/100.

Note that this sort of flexible load balancing is not readily possible with the prior art configuration of FIG. 1 since call handling capacity is a direct function of terminated circuits (e.g. number of PRIs). Thus, the prior art servers 116 cannot as easily take advantage of improvements in processing power without replacing the physical telephony hardware to support higher density circuit termination.

In some embodiments, the functionality of the SIP proxy 304 can be subsumed in whole or in part into the media gateway 302. The ability to do this will depend in large part on the monitoring and routing capabilities of the particular media gateway 302.

Next, at step 404, the SIP request is acknowledge by the selected server 306A-Z. At that point, the data (e.g. voice channel, or stream) flows between the server, the media gateway, and the telephone network 104. The data portion can be sent using one or more standard International Telecommunication Union (ITU) and/or IETF protocols, e.g. RTSP, RTP, Q.931, etc.

In one embodiment, compression of the stream is intentionally disabled between the media gateway 302 and the servers 306A-Z. Typical, VoIP data transmissions use (heavy) compression to reduce bandwidth demands; however, such compression could severely reduce the quality of speech recognition results and thus is not used. While the lack of compression would be undesirable in many other VoIP environments due to high bandwidth consumption for thousands of VoIP streams, the operator of the phone application platform need only provide high bandwidth in between the media gateway 302 and the servers 306 (frequently only a short distance, e.g. within a server room, etc.)

Lastly, at step 406, the servers communicate with the media gateway using SIP requests to control handling of the session (call). Unlike the servers with telephony cards 116A-Z of FIG. 1, the servers 306A-Z cannot directly control handling of the circuit switched line. (Recall that in the configuration of FIG. 1, one or more circuit switched PRIs terminated at each server with telephony cards 116A-Z and the telephony cards could directly control the circuit, e.g. the call.) Instead, to control call handling features (e.g. request termination of the call) or other special features (e.g., the communication may be to redirect an RTP media stream(s) to accomplish tromboning independent of the server 306A-Z), one or more appropriate messages can be sent according to the SIP protocol.

As an example, if the initial caller to the phone application platform 110 requests an outbound call transfer (e.g. place a call to a third party), one or more SIP requests could be generated by the servers 306A-Z to the media gateway 302 (possibly via the SIP proxy 304) to cause the initiation of the call. For example, to contact a restaurant, the server could request a call placement to the phone number of the restaurant be added to the in progress session between the initial caller and the server. The media gateway 302 and/or the SIP proxy 304 could respond to this request by (ultimately) opening circuit switched connections back over the telephone network 104 to the restaurant. Notice, importantly, that there is no longer a need to reserve circuits on any particular line or interface.

Thus, despite only using the VoIP technologies in the last "100 meters" or so, e.g. within a server room, some significant functionality becomes available that also serves to increase flexibility: easier multi-party features and elimination of reserved circuit capacity. In one embodiment, VoIP can be viewed as providing an abstraction layer to the circuit switched network.

In U.S. patent application Ser. No. 09/426,102, entitled "Method and Apparatus for Content Personalization Over a Telephone Interface", having inventors Hadi Partovi. et. al., a functional decomposition of a phone application platform substantially similar to the instant phone application platform 110 is presented. According to that functional model, the servers 306A-Z could provide a subset of the identified functions such as call management, execution, evaluation, data connectivity, and/or streaming. The specific functions provided by the servers 306A-Z will depend on their processing power, capacity, and number. For example, in the prior art arrangement of FIG. 1, the servers with telephony cards 116A-Z could only handle a specific number of calls as determined by the physical connectivity of the boxes to the telephone network. In contrast, the number of calls handled by the servers 306A-Z can be adjusted for their processing power, current load, an operator-imposed cap (e.g. no more than N calls per server with an eye towards a specific quality of service), and/or other criteria. In a preferred embodiment, servers 306A-Z each include a VoiceXML interpreter so that they may be programmed to perform a wide variety of call handling tasks. VoiceXML (or Voice eXtensible Markup Language) is the name of a programming language promulgated by the VoiceXML Forum (an industry forum founded by AT&T, IBM, Lucent and Motorola) for designing and creating audio dialogs that include, inter alia, synthesized speech, voice-recognition, streaming audio and DTMF input.

In one embodiment, the SIP proxy 304 distributes load evenly across the servers 306A-Z and monitors their load through one or more communication channels, e.g. periodic queries to the servers 306A-Z. If the number of calls at a given time exceeds a predetermined threshold, one or more messages may be generated by the SIP proxy 304 (or one of the servers 306A-Z) to instruct the media gateway 302. The message might indicate that no more calls should be taken, e.g. busy the line. Or more specifically, when the servers 306A-Z are handling calls from multiple legal entities, the message might more specifically stop the acceptance of calls for one legal entity (e.g. by dialed phone number) in accordance with one or more limits (e.g. contracts, fairness (everyone has to have capacity for at least X calls), etc.). Responsive to such a message, the media gateway 302 may send one or more messages over the PSTN, e.g. using signaling system 7 (SS7) or such other protocols as may be available. The result, calls to a first number, +1 (800) 555-TELL might be able to proceed while calls to +1 (800) PAR-TNER might receive a busy signal or some other network status message, e.g. "All circuits are busy".

The above type of differentiated and targeted service control is not readily possible in the circuit switched configuration of FIG. 1 because of the lack of cross-communication between the servers with telephony cards 116A-Z and the lack of a centralized communication with the switching systems of the telephone network 104.

In the case where the connectivity between the media gateway 302 and the telephone network 104 does not easily support low level communication to allow the media gateway 302 to control the behavior of the telephone network 104, the media gateway 302 can send SIP requests to a special destination, e.g. an extra server of substantially the same type as the servers 306A-Z to cause a message to be played and then terminate the call. In other embodiments, if the media gateway 302 supports the capability, it can generate and play back a busy message for specific numbers at specific times.

Returning to the prior art arrangement of FIG. 1, the telephony cards in the servers 116A-Z typically included digital signal processors (DSPs) for processing the audio and assisting in a variety of ways with voice recognition. For example, the Nuance speech recognition system from Nuance Corporation, Mountain View, Calif., comes configured to support Dialogic telephony cards with certain features occurring on the card. Similarly, the audio providers (the software for working with the hardware cards to get/send audio) are configured in many instances to make use of the DSPs on the telephony cards. Those software audio providers accordingly have to be re-written according to the present invention to rely on the processor(s) in the server 306A-Z to send and get requests to/from network packets in a suitable VoIP data transmission format (as negotiated using SIP) and/or to generate/manage additional SIP requests. Specific functions include decoding received network packets containing audio data and preparing them for voice recognition processing, including: echo cancellation, noise filtering, end pointing, and speech recognition. Other functions of the audio provider include taking sounds such as streaming audio and other audio files and converting them into network packets according to the data transmission format.

Additional protocols may be used in conjunction with SIP to further support the VoIP arrangement disclosed. For example, the PINT protocol of RFC 2848 may be used to communicate out from the phone application platform 110 to the circuit switched telephone network 104 for one or more purposes, e.g. for outbound call notification.

D. Automated Configuration Management

According to some embodiments of the invention, one or more additional computers can be coupled in communication with the phone application platform 110, e.g. configuration server 310 (shown as part of phone application platform 110). The configuration server 310 is designed to allow easy setup of the servers 306A-Z, the SIP proxy 304, and/or other computers providing the phone application platform. Configuration server 310 typically includes host descriptions (i.e., the software configuration that is mapped to each respective server 306A-Z) and a service map (i.e., information that identifies how the set of servers 306A-Z are assigned in order to maintain an operational phone platform 110).

The configuration server 310 can leverage existing protocols that are available within the respective computers to offer these features. As a result, given a unique identifier for a machine such as a hardware Ethernet address, aka media access control (MAC) address, a processor serial number, a stored value (e.g. hostname and/or Internet protocol (IP) address), and/or some other unique identifier, machines can be automatically configured with the necessary software.

This process is referred to as "blasting" or "jumpstarting" and is different from, but complimentary to, network booting and dynamic host configuration protocol (DHCP). More specifically, the blasting process creates a working system image on the blasted computer together with all appropriate software.

For example, if the server 306A were being re-purposed from performing speech recognition to handle telephony, an entry on the configuration server 310 for the server 306A could be modified to indicate the new machine purpose. Then using a net boot (or floppy boot) the machine could load an image from the configuration server 310 that causes the machine to be configured to behave in the new purpose. For example, the hard drive might be re-partitioned, a new operating system loaded (Windows™ NT to Solaris™ or FreeBSD), software removed or installed (SIP server and audio providers installed while speech recognition packages removed), etc.

The bottom line: minimal (or no) human intervention once the machine's entry in the configuration server 310 is updated, hence the respective configurations of servers 306A-Z are effectively "slaved" to the corresponding entries in configuration server 310. Deployment of configuration server 310 provides a number of other benefits, inter alia: (i) automated software (re)configuration and updates for extant or replacement servers 306A-Z; (ii) automated management, assignment, re-assignment, and control of system resources via configuration server 310; and (iii) automated system monitoring, inventory tracking, auditing, and alarming (in the event of errors or failures). According to one embodiment of the invention, the configuration server 310 includes appropriate images of operating systems, software, and/or configuration files for the full range of computers used by the phone application platform 110. Additionally, a database (or table) showing correspondences between a unique identifier for each computer and configuration options

E. Conclusion

By abstracting the circuit switched nature of the broader telephone network in the last 100 or so meters, e.g. within a server room, surprising benefits can result as described above. Further, these benefits outweigh the sometimes higher costs of such an arrangement due to the need for expensive equipment (e.g. media gateways) and high bandwidth packet based routing and switching fabrics between the media gateways and the servers.

Accordingly, a method and apparatus for using voice over Internet Protocol (VoIP) technologies in a localized fashion has been described. The approach allows improved capacity and flexibility in providing voice activated services. Further, the approach has several natural extensions such as internally routing calls in VoIP format to remote servers e.g. for overflow to a remote data center from the location of the servers 306A-Z. Similarly, if costs for using the packet switched network are sufficiently cheaper than the circuit switched telephone network 104, some outbound calls could be placed using outbound calling through a VoIP carrier (e.g. by directing the media gateway 302 to route outbound calls using VoIP to a VoIP gateway belonging to a telecommunications carrier or one belonging to the operator of the phone application platform 110.)

In some embodiments, phone application platform 110 and the development platform web server 108 can be hardware based, software based, or a combination of the two. In some embodiments, phone application platform 110 is comprised of one or more computer programs that are included in one or more computer usable media such as CD-ROMs, floppy disks, or other media. In some embodiments, audio providers, SIP servers, SIP clients, SIP proxies, and/or some other type of SIP program, are included in one or more computer usable media.

Some embodiments of the invention are included in an electromagnetic wave form. The electromagnetic waveform comprises information such as audio providers, SIP servers, SIP clients, SIP proxies, and/or some other type of SIP program. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of using voice over Internet protocols (VoIP) to handle circuit switched calls in a voice activated system, the method comprising:
   terminating an inbound circuit switched call of a channel of a first primary rate interface at a device that translates the inbound circuit switched call into a VoIP format as a packet switched call;
   forwarding the packet switched call in the VoIP format from the device to a computer system;
   performing speech recognition on the packet switched call using audio data extracted from the VoIP format; and
   when an outbound call transfer is requested for the inbound circuit switched call, sending from the computer system to the device a request to initiate an outbound call wherein the outbound call is initiated as a second circuit switched call on a channel of a second primary rate interface that is different from the first primary rate interface.

2. The method of claim 1, wherein the device and the computer system are located in physical proximity.

3. The method of claim 1, wherein there is a second computer system physically distant from the device and wherein the forwarding goes to the second computer system responsive to a failure of the computer system.

4. A method of using voice over Internet protocols (VoIP) to handle circuit switched calls in a voice activated system, the method comprising:
   terminating a circuit switched call at a device that translates the circuit switched call into a VoIP format as a packet switched call;
   forwarding the packet switched call in the VoIP format from the device to a computer system;

wherein the forwarding occurs responsive to acknowledgement of an SIP request from the computer system;
performing speech recognition on the packet switched call using audio data extracted from the VoIP format by the computer system;
wherein, the computer system is selected from a plurality of computer systems based on a criteria;
wherein, the criteria includes, network monitoring showing faults with one or more of the plurality of computing systems;
wherein prior to the forwarding, sending a message from the device to a second computer system, the second computer system selecting the computer system from a plurality of computer systems to receive the call;
wherein the selecting according to a set of criteria to balance number of calls is being handled by each of the plurality of computer systems.

5. The method of claim 4, wherein the message comprises a session initiation protocol (SIP) request.

6. The method of claim 1, wherein the device includes a gateway.

7. The method of claim 1, further comprising:
selecting the computer system from a plurality of computer systems to receive the packet switched call by a proxy server.

8. The method of claim 7, wherein, the plurality of computer systems and the proxy server are components in a phone application platform.

9. The method of claim 1, wherein, the criteria further includes, a telephone identifying information based on associations of some computing systems of the plurality of computing systems with calling or called parties.

10. The method of claim 1, wherein, the criteria further includes, online/offline status of the plurality of computing systems.

11. The method of claim 1, wherein, the criteria is selected by an operator of a phone application platform of which the plurality of computing systems are components.

12. A system for using voice over Internet protocols (VoIP) to handle circuit switched calls in a voice activated system, the method comprising:
means for, translating a circuit switched call into a VoIP format as a packet switched call;
means for, forwarding the packet switched call in the VoIP format to a server;
wherein the forwarding occurs responsive to acknowledgement of an SIP request from the server;
means for, selecting the server from a plurality of servers;
wherein, the server is selected from the plurality of computer systems based on a criteria;
wherein, the criteria includes, network monitoring showing faults with one or more of the plurality of servers;
means for, performing speech recognition on the packet switched call using audio extracted from the VoIP format
wherein, the criteria further includes, a telephone identifying information based on associations of some computing systems of the plurality of computing systems with calling or called parties.

13. A method of using voice over Internet protocols (VoIP) to handle circuit switched calls in a voice activated system, the method comprising:
terminating a circuit switched call at a device that translates the circuit switched call into a VoIP format as a packet switched call;
forwarding the packet switched call in the VoIP format from the device to a computer system;
wherein the forwarding occurs responsive to acknowledgement of an SIP request from the computer system;
performing speech recognition on the packet switched call using audio data extracted from the VoIP format by the computer system;
selecting, by a proxy server, the computer system from a plurality of computer systems to receive the call by a proxy server;
wherein, the plurality of computer systems and the proxy server are components in a phone application platform hosting the voice activated system;
wherein, the computer system is selected from a plurality of computer systems based on a criteria;
wherein, the criteria includes, network monitoring showing faults with one or more of the plurality of servers; and
wherein, the criteria is selected by an operator of a phone application platform of which the plurality of computing systems are components.

14. A computer-readable memory storing instructions for controlling a server to use voice over Internet protocols (VoIP) to handle circuit switched calls in a voice activated system, the instructions comprising instructions that:
receive a packet switched call in a VoIP format from a device that terminated an inbound circuit switched call of a channel of a first primary rate interface initiated by a caller and that translated the inbound circuit switched call into a packet switched call in the VoIP format;
receive from the caller via the packet switched call a request for an outbound call transfer; and
in response to receiving the request, send to the device a request to initiate an outbound call wherein the outbound call is initiated as a second outbound circuit switched call on a channel of a second primary rate interface that is different from the first primary rate interface.

15. The computer-readable memory of claim 14 wherein a proxy server selects the server that is to receive the packet switched call from a plurality of servers.

16. The computer-readable memory of claim 14 wherein the instructions further include instructions that perform speech recognition on the voice of the packet switched call.

17. The computer-readable memory of claim 14 wherein capacity on the first primary rate interface is not reserved to support outbound call transfers.

18. A computer-readable memory storing instructions for controlling one or more servers to use voice over Internet protocols (VoIP) to handle circuit switched calls in a voice activated system, the instructions comprising instructions that:
receive a first packet switched call for a conference call from a device that terminated a first inbound circuit switched call of a channel of a first primary rate interface and that translated the first inbound circuit switched call into the first packet switched call;
receive a second packet switched call for the conference call from a device that terminated a second inbound circuit switched call of a channel of a second primary rate interface and that translated the second inbound circuit switched call into the second packet switched call; and
connect the first packet switched call and the second packet switched call in the conference call even though the first inbound circuit switched call and the second inbound circuit switched call are on channels of different primary rate interfaces.

19. The computer-readable memory of claim 18 wherein a proxy server selects the server that is to receive each of the packet switched calls.

20. The computer-readable memory of claim 18 wherein the instructions further include instructions that perform speech recognition on the voice of the packet switched calls.

21. The computer-readable memory of claim 14 wherein capacity on the first primary rate interface is not reserved to support conference calls.

* * * * *